United States Patent [19]

Kirlin

[11] Patent Number: 4,970,351

[45] Date of Patent: Nov. 13, 1990

[54] WIRING HARNESS CONDUIT

[75] Inventor: Rick J. Kirlin, Royal Oak, Mich.

[73] Assignee: United Techologies Automotive, Inc., Dearborn, Mich.

[21] Appl. No.: 517,800

[22] Filed: Mar. 2, 1990

[51] Int. Cl.⁵ ............................................. H02G 3/04
[52] U.S. Cl. ................................... 174/68.3; 138/121;
138/137; 138/DIG. 9; 174/72 A; 174/136;
428/36.5; 428/36.91
[58] Field of Search ................ 174/68.3, 72 A, 110 F,
174/121 A, 135, 136, 167; 138/121, 122, 137,
139, 141, 145, 146, 151, DIG. 9, 128; 181/198,
200, 202, 204, 205, 207, 211, 224, DIG. 1;
296/39.3, 208; 428/36.5, 36.9, 36.91

[56] References Cited

U.S. PATENT DOCUMENTS

| | | | |
|---|---|---|---|
| 3,060,069 | 10/1962 | Sindars | 174/136 X |
| 3,175,586 | 3/1965 | Tatsch | 138/137 |
| 3,374,856 | 3/1968 | Wirt | 181/224 |
| 3,711,632 | 1/1973 | Ghirandi | 174/135 |
| 3,855,028 | 12/1974 | Larson | 138/DIG. 9 X |
| 4,044,799 | 8/1977 | Higbee et al. | 138/137 X |
| 4,191,273 | 3/1980 | Williams | 181/200 X |
| 4,384,167 | 5/1983 | Nestor | 174/135 X |

Primary Examiner—Laramie E. Askin
Attorney, Agent, or Firm—Ronald G. Cummings

[57] ABSTRACT

An automobile wiring harness conduit having a corrugated tubular wall member of resilient plastic material and an outer covering of flexible sound-deadening foamed material with an axial slit from end-to-end through the outer covering and the wall member.

12 Claims, 1 Drawing Sheet

U.S. Patent
Nov. 13, 1990
4,970,351
FIG. 1
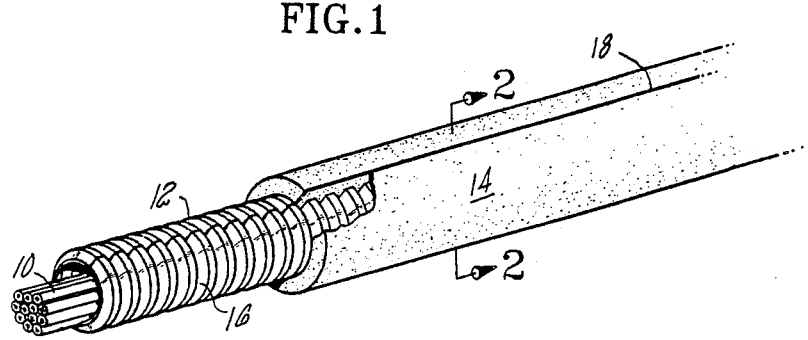
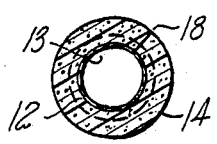
FIG. 2

WIRING HARNESS CONDUIT

BACKGROUND AND SUMMARY OF THE INVENTION

This invention relates to electrical wiring conduit and more particularly to wiring conduit for automobile wiring harnesses.

In automobiles, the various electrical components of the vehicle are electrically connected to the battery via electrical leads or wires. These leads are usually grouped together to form what is commonly termed a wire harness. In order to protect the wiring harness from cuts and chafing which might occur from contact with sharp edges, sheet metal parts, body panel attachments, etc., the harness is mounted in a housing. One highly satisfactory type of housing is a plastic corrugated tube which is axially slit throughout its length. The corrugated tubes are versatile in that they can be readily bent for installation and the axial slit allows a lead to be routed out from the harness at any location along the tube.

The corrugated tubes such as those disclosed in Nestor, U.S. Pat. No. 4,384,167 and Ghirardi et al, U.S. Pat. No. 3,711,633, incorporated herein by reference, are generally made of stiff plastic material which adequately protects the wiring harness from chafing and cutting but may produce rattles and unacceptable noise in certain applications.

In applications required to be "squeak-free", the wiring harness has been wrapped with tape and housed in a relatively thick foamed tubing. The tubing is slit axially and secured about the wiring harness by wrapping it with tape at spaced intervals. This tubing, however, does not provide substantial protection for the wire harness and is easily damaged. Moreover, the foamed tubing is bulky, being ⅜ inch to ½ inch thick, and is somewhat inconvenient to install.

Accordingly, it is an object of the present invention to provide a new and improved conduit for wiring harnesses which reduces or eliminates noise generation and fully protects the wiring harness from cuts and chafing.

A further object of the invention is to provide such a wiring harness conduit which is compact, convenient to install and durable in use.

Other objects will be in part obvious and will be in part pointed out more in detail hereinafter.

Accordingly, it has been found that the foregoing and related objects are attained in a wiring conduit for housing the electrical wires of an automobile wiring harness which includes a tubular inner wall member of resilient plastic material forming a longitudinal wire passageway for housing the electrical wires and an outer covering of flexible sound-deadening foamed material. The inner wall member is corrugated along its longitudinal axis so as to be flexible in directions transverse to the longitudinal axis and an axial slit extends through the outer covering and the inner wall. In a preferred embodiment, the outer covering is a foamed polymer such as cellular polyethylene and is integrally formed with the tubular wall by spraying or extruding techniques.

BRIEF DESCRIPTION OF THE DRAWINGS

FIG. 1 is a perspective view of the wiring conduit of the present invention with the outer covering partially cut away to show the inner wall member.

FIG. 2 is a cross-sectional view taken along the line 2—2 of FIG. 1 with the wires omitted for clarity.

DESCRIPTION OF THE PREFERRED EMBODIMENT

Although specific forms of the present invention have been selected for illustration in the drawings, and the following description is drawn in specific terms for the purpose of describing these forms of the invention, the description is not intended to limit the scope of the invention which is defined in the appended claims.

Referring to FIG. 1, the wiring conduit of the present invention is shown housing a plurality of electrical wires 10 of an automobile wiring harness. The wiring conduit comprises a tubular inner wall member 12 and a foamed outer covering 14. The tubular wall member 12 forms a longitudinal wire passageway 13 for the wires 10 and is made of a resilient plastic material, preferably polyvinylchloride, to protect the wires against cuts and chafing. The wall member 12 is corrugated annularly along its entire length so as to be highly flexible in directions transverse to its longitudinal axis. Alternately, the wall member may be made of other stiff plastic materials, such as nylon, and may be corrugated helically.

The outer covering 14 uniformly covers the corrugated outer surface 16 of wall member 12. The covering 14 is a flexible sound-deadening foamed material of sufficient thickness such that the wiring conduit will not generate undesirable rattles, squeaks or other vibrational noises. Preferably, the covering is a foamed polymer such as cellular polyethylene and ⅛ to ¼ inch thick.

The foamed polymer material is integrally formed to the corrugated outer surface 16 of wall member 12 by sprayed-on application techniques or by extrusion techniques which are known in the art. In the illustrated embodiment, the wall member 12 and covering 14 form an integral conduit section. Other suitable application techniques may also be utilized.

The wiring conduit has an axial slit 18 through the outer covering 14 and wall member 12 which extends along the entire length of the conduit. The slit facilitates routing or "breaking out" selected wires from the wiring harness as well as mounting the conduit about the wiring harness. Even though the wiring conduit is axially slit, it does not come apart. The resiliency of the plastic wall member keeps the axial slit closed to maintain the continuity of the foamed outer covering as well as to form a protective housing around the wire harness. Consequently, no taping or similar wrapping is generally required.

In installation, the conduit is easily installed about the wiring harness and is extremely flexible so as to follow the desired wire path. The wire harness is protected from cuts and chafing by the resilient plastic wall 12 and the foamed material outer layer prevents generation of undesirable noise. Accordingly, a wiring conduit has been provided which achieves all the stated objectives.

As will be apparent to persons skilled in the art, various modifications and adaptations of the structure above described will become readily apparent without departure from the spirit and scope of the invention, the scope of which is defined in the appended claims.

What is claimed is:

1. In combination with an automobile wiring harness having a plurality of electrical wires extending between first and second points within an automobile body, a wiring conduit section housing said wires comprising:

a tubular wall member of resilient material forming a longitudinal wire passageway housing said wires between said first and second points, said wall member having an outer surface and being corrugated along its longitudinal axis so as to be flexible in directions transverse to said longitudinal axis, an outer covering of flexible sound-deadening foamed material covering said outer surface of said tubular wall member, and said conduit section having an axial slit through said outer covering and said tubular wall member.

2. The combination of claim 1 wherein said foamed material is a foamed polymer.

3. The combination of claim 2 wherein said foamed polymer is cellular polyethylene.

4. The combination of claim 2 wherein said outer covering is integrally formed to said outer surface.

5. The combination of claim 4 wherein said outer covering is sprayed on said outer surface of said wall member.

6. The combination of claim 4 wherein said outer covering is extruded on said outer surface of said wall member.

7. The combination of claim 1 wherein said resilient material is plastic material.

8. Automobile wiring harness conduit comprising:

a tubular wall member of resilient plastic material forming a longitudinal wire passageway between first and second opposite ends, said wall member having an outer surface and being corrugated along its longitudinal axis so as to be flexible in directions transverse to said longitudinal axis, an outer covering of flexible sound-deadening foamed material integrally formed on said outer surface of said wall member, and an axial slit through said outer covering and said tubular wall member extending between said first and second ends.

9. The device of claim 8 wherein said foamed material is a foamed polymer.

10. The device of claim 9 wherein said foamed polymer is cellular polyethylene.

11. The device of claim 9 wherein said outer covering is sprayed on said outer surface of said wall member.

12. The device of claim 9 wherein said outer covering is extruded on said outer surface of said wall member.

* * * * *

UNITED STATES PATENT AND TRADEMARK OFFICE
CERTIFICATE OF CORRECTION

PATENT NO. : 4,970,351
DATED : November 13, 1990
INVENTOR(S) : Rick J. Kirin

It is certified that error appears in the above-identified patent and that said Letters Patent is hereby corrected as shown below:

ON THE TITLE PAGE

[75] "Rick J. Kirlin" should be --Rick J. Kirin--

[19] "Kirlin" should read --Kirin--

Signed and Sealed this

Fifth Day of May, 1992

*Attest:*

DOUGLAS B. COMER

*Attesting Officer*      *Acting Commissioner of Patents and Trademarks*

UNITED STATES PATENT AND TRADEMARK OFFICE
CERTIFICATE OF CORRECTION

PATENT NO. : 4,970,351

DATED : November 13, 1990

INVENTOR(S) : RICK J. KIRIN

It is certified that error appears in the above-identified patent and that said Letters Patent is hereby corrected as shown below:

On the title page;

[73] "Techologies" should be --Technologies--

Signed and Sealed this

Twenty-sixth Day of May, 1992

*Attest:*

DOUGLAS B. COMER

*Attesting Officer* — *Acting Commissioner of Patents and Trademarks*